(12) United States Patent
Mizuochi et al.

(10) Patent No.: US 6,801,720 B1
(45) Date of Patent: Oct. 5, 2004

(54) OPTICAL SIGNAL QUALITY SUPERVISORY DEVICE

(75) Inventors: Takashi Mizuochi, Tokyo (JP); Yojiro Osaki, Tokyo (JP); Aritomo Uemura, Tokyo (JP); Hiroshi Ichibangase, Tokyo (JP); Kiwami Matsushita, Tokyo (JP); Tadayoshi Kitayama, Tokyo (JP); Shu Yamamoto, Tokyo (JP); Tetsuya Miyazaki, Tokyo (JP); Takatomi Kabashima, Tokyo (JP); Naoki Kobayashi, Tokyo (JP)

(73) Assignees: Mitsubishi Denki Kabushiki Kaisha, Tokyo (JP); KDD Corporation, Tokyo (JP)

( * ) Notice: Subject to any disclaimer, the term of this patent is extended or adjusted under 35 U.S.C. 154(b) by 0 days.

(21) Appl. No.: 09/559,644

(22) Filed: Apr. 28, 2000

Related U.S. Application Data

(63) Continuation-in-part of application No. PCT/JP99/04644, filed on Aug. 27, 1999.

(30) Foreign Application Priority Data

Aug. 31, 1998 (JP) .......................................... 10-245594

(51) Int. Cl.⁷ .............................................. H04B 10/16
(52) U.S. Cl. ......................... 398/30; 398/181; 398/177
(58) Field of Search ...................... 398/30, 33, 81–185, 398/37; 379/32.01; 340/3.1; 356/320

(56) References Cited

U.S. PATENT DOCUMENTS 5,502,810 A * 3/1996 Watanabe .................... 398/177
5,844,706 A * 12/1998 Kohn et al. .................. 398/181
6,323,978 B1 * 11/2001 Harley et al. ................. 398/30
6,370,300 B1 * 4/2002 Eggleton et al. .............. 385/37

* cited by examiner

Primary Examiner—Jason Chan
Assistant Examiner—David C. Payne
(74) Attorney, Agent, or Firm—Birch, Stewart, Kolasch & Birch, LLP

(57) ABSTRACT

The present invention has an object to obtain an optical signal quality supervisory device that supervises the quality of an optical signal simply, efficiently and with high accuracy without inviting an increase in cost, an increase in circuit scale and increase in power consumption. The bit rate of the optical supervisory channel is made lower than the bit rate of the optical main channel that is transmitted over an optical communication system, but the reception electric band width of a receiver that receives the optical supervisory channel is made equal to or wider than the reception electric band width of a receiver that receives the optical main channel. Also, the optical supervisory channel is made up of an SOH (section over head) frame to detect an error of the BIP (bit interleaved parity) byte of SOH, thereby supervising the quality of the optical communication system, in particular, the light wave network.

11 Claims, 10 Drawing Sheets

FIG. 3

| STM-16 CORRESPONDING Q VALUE (dB) | THE NUMBER OF SUPERVISORY FRAMES | ERROR COUNT /FRAME | ERROR RATE IN STM-32 CORRESPONDING RECEPTION BAND | ERROR RATE CONVERTED INTO STM-16 | ERROR CONVERTED INTO STM-1 |
|---|---|---|---|---|---|
| 15.6 | 26×3 | 5 | $1×10^{-5}$ | $8×10^{-10}$ | $8×10^{-169}$ |
| 16.6 | 260×3 | 5 | $1×10^{-6}$ | $9×10^{-12}$ | $3×10^{-180}$ |
| 17.3 | 2,081×3 | 4 | $1×10^{-7}$ | $9×10^{-14}$ | $5×10^{-190}$ |
| 18.0 | 20,808×3 | 4 | $1×10^{-8}$ | $1×10^{-15}$ | $1×10^{-198}$ |
| 18.6 | 208,074×3 | 4 | $1×10^{-9}$ | $1×10^{-17}$ | $4×10^{-208}$ | under
OPTICAL SIGNAL QUALITY SUPERVISORY DEVICE

CROSS REFERENCE TO RELATED APPLICATION

This is a continuation of International Application PCT/JP99/04644, with an international filing date of Aug. 27, 1999.

TECHNICAL FIELD

The present invention relates to an optical communication system, and more particularly to an optical signal quality supervisory device that supervises the quality of a light wave network.

BACKGROUND ART

In an optical communication system, the quality supervision of an optical signal is very important for the operation of a network. In a light amplification relay transmission system, the degradation of an optical SNR (Signal-to-Noise Ratio) caused by the degradation of a light amplifier is a factor in the degradation of the quality of an optical signal. A demand for supervising this optical signal with high accuracy has been increased. Also, in a wavelength multiplex system, because a plurality of wavelength channels interfere with each other, the supervision of the optical signal quality with higher precision has been demanded.

In addition, in a coming light wave network, because a plurality of optical network elements (ONEs) constitute a transparent network, if one of those ONEs generates an optical noise, the optical transmission line quality of the entire network is degraded. Thus, a quality supervision high in level is required.

FIG. 16 is a conceptual block diagram showing a light wave network constituted by four ONEs as the optical communication system.

In FIG. 16, reference numeral 90 denotes an optical fiber cable, and 91 to 94 denote optical network elements (ONEs), and each of those ONEs is made up of an optical add-drop multiplexer, an optical cross-correct, an optical line terminal and so on. Reference numeral 95 denotes a main signal transmitter (LINE OS), 96 is a main signal receiver (LINE OR), 97 is a main signal, 98 is an optical supervisory channel transmitter, 99 is an optical supervisory channel receiver that constitutes an optical signal quality supervisory device in association with the supervisory signal optical transmitter 98, and 100 is an optical supervisory channel that is transmitted from the optical supervisory channel transmitter 98 and received by the optical supervisory channel receiver 99.

It is assumed that a trouble such as an increase in the loss of optical parts or a failure of the optical amplifier occurs, for example, in the ONE 92 in FIG. 16.

When the ONE 92 transmits the optical supervisory channel 100, the quality of the optical supervisory channel 100 is degraded by the trouble. The optical supervisory channel receiver 99, upon receiving the optical supervisory channel, detects the degradation of quality and notifies all the ONEs of the trouble through a built-in network management system (NMS).

Incidentally, the conventional optical supervisory channel 100 is made up of a bit interleaved parity (hereinafter referred to as "BIP") byte provided in a section over head (SOH) of a synchronous digital hierarchy (SDH). The BIP byte is made up of a B1 byte (BIP-8) or a B2 byte (BIPN×24) and counts code errors between the respective relays, between the relay and the line terminal device, or between the respective line terminal devices. The details are disclosed in "Error Rate Degradation Detecting Method in SDH" Spring Conference of The Institute of Electronics, Information and Communication Engineers, B-762, 1990, written by Fujime et al.

The inner structure of the conventional optical supervisory channel receiver 99 that supervises the quality of transmission line by using the BIP byte is shown in FIG. 17.

In FIG. 17, reference numeral 101 denotes an optical fiber; 102, a photo diode (hereinafter referred to as "PD"); 103, a pre-amplifier; 104, a post-amplifier; 105, an equivalent filter; 106, a clock extraction circuit; 107, a discriminator; 108, a serial-parallel conversion circuit; 109, a frame synchronizing circuit; 110, a descrambler circuit; 111, a BIP error detection circuit; 112, a signal degradation (SD) alarm; 113, a section over head (SOH) termination circuit; and 114, a system alarm transfer byte (APS byte).

Subsequently, the operation of the conventional optical supervisory channel receiver 99 will be described.

The optical signal inputted from the optical fiber 101 is photoelectrically converted by the PD 102 and thereafter amplified by the pre-amplifier 103 and the post-amplifier 104. The amplified received signal is subjected to band limit and waveform shaping by the equivalent filter 105. The equivalent filter 105 is normally formed of a quaternary vessel Tomson filter. The equalized signal is branched into two signals, and one of those signals is inputted to the clock extraction circuit 106 from which a clock signal is extracted. The other signal is inputted to the discriminator 107, and then discriminated and reproduced by the extracted clock signal.

The signal discriminated and reproduced by the discriminator 107 is normally developed into 8 parallel signals by the serial-parallel conversion circuit 108, passes through the frame synchronizing circuit 109 and then is descrambled by the descramble circuit 110. Thereafter, the BIP error detection circuit 111 detects an error from the BIP byte separated by the BIP error detection circuit. If the detected error exceeds a preset threshold value, the SD alarm 112 is issued. Also, the APS byte 114 that receives and transmits the supervisory signal between the different ONEs is extracted from the SOH termination circuit 113.

It is assumed that the main signal is, for example, of STM-16 (2.48832 Gbit/s). In this case, the PD 102, the pre-amplifier 103, the post-amplifier 104, the discriminator 107 and the serial-parallel conversion circuit 108 are formed of high-speed semiconductors having a frequency band of 2 GHz or higher. On the other hand, the equivalent filter 105 is set to about 0.7 times the normal bit rate, that is, a frequency band of 1.7 GHz.

However, in the above-described conventional optical signal quality supervisory device, particularly in the optical supervisory channel receiver 99, as the bit rate is higher in speed, it becomes more difficult to constitute the circuit shown in FIG. 17. In particular, the high-speed semiconductor integrated circuit technique is demanded for the clock extraction circuit 106, the discriminator 107 and the serial-parallel conversion circuit 108, accompanied by high costs and increased power consumption. Also, the frame synchronizing circuit 109, the descramble circuit 110 and the BIP error detection circuit 111 increase in circuit scale, and a volume for installing the circuit increases, thereby leading to enlargement of the entire device.

The present invention has been made in order to solve the above-described problems, and therefore an object of the present invention is to provide an optical signal quality supervisory device that is capable of supervising the quality of an optical signal simply, efficiently and with high accuracy without inviting an increase in circuit scale, high costs and an increase in power consumption.

DISCLOSURE OF THE INVENTION

In order to achieve the above object, an optical signal quality supervisory device according to the present invention comprises: optical supervisory channel transmitting means that transmits an optical supervisory channel for supervising the transmission line quality of an optical communication system to a main optical channel receiving means which receives a main optical channel transmitted over the optical communication system, and an optical supervisory channel receiving means that receives the optical supervisory channel transmitted through the optical communication system to supervise the quality of the transmission line, and is characterized in that the bit rate of the optical supervisory channel is made lower than the bit rate of the main optical channel, and in that there are provided, as the optical supervisory channel receiving means, reception discriminating means that receives the signal transmitted through the optical communication system to discriminate and reproduce the optical supervisory channel from the received signal, and error detecting means that has an electric band width narrower than the electric band width of the main optical channel receiving means and detects an error on the basis of the optical supervisory channel that is discriminated and reproduced by the reception discriminating means.

Also, the optical signal quality supervisory device is characterized in that the reception discriminating means has substantially the same electric band width as the electric band width of the main optical channel receiving means.

Further, the optical signal quality supervisory device is characterized in that the reception discriminating means has the electric band width wider than the electric band width of the main optical channel receiving means.

Still further, the optical signal quality supervisory device is characterized in that the discrimination threshold value of the reception discriminating means which is used to discriminate the optical supervisory channel is so set as to be shifted from the optimum threshold value.

Yet still further, the optical signal quality supervisory device is characterized in that another optical supervisory channel receiving means having the electric band width equal to or less than the bit rate of the optical supervisory channel is provided in parallel with the optical supervisory channel receiving means.

Yet still further, the optical signal quality supervisory device is characterized in that the optical communication system comprises a wavelength multiplex system that relays at multiple stages optical amplifiers that amplify a plurality of main optical channels different in wavelength, and in that the optical supervisory channel receiving means includes, at its reception end, a band pass filter a pass band of which is set in accordance with the gain of the optical amplifiers in the wavelength multiplex system.

Yet still further, the optical signal quality supervisory device is characterized in that the pass band of the band pass filter is set to the gain minimum wavelength of the optical amplifiers in the wavelength multiplex system.

Yet still further, the optical signal quality supervisory device is characterized in that the pass band of the band pass filter is set to the gain peak wavelength of the optical amplifiers in the wavelength multiplex system.

Yet still further, the optical signal quality supervisory device is characterized in that the optical supervisory channel transmitting means includes sweeping means for discretely sweeping the wavelength of the optical supervisory channel between the wavelengths of the adjacent main optical channels.

Yet still further, the optical signal quality supervisory device is characterized in that the sweeping means comprises: a light source that generates a noise light over a wide band; a supervisory signal source; a wavelength selection filter connected to the light source and swept by a step-like signal generated from a wavelength sweep signal synchronous with the supervisory signal source; a modulator that modulates the noise light from the light source which is cut off by the wavelength selection filter according to the supervisory signal source; and an optical shutter that shuts out an output of the modulator when crossing the wavelength of the main signal.

Yet still further, the optical signal quality supervisory device is characterized in that the wavelength selection filter is formed by connecting in series Fabry-Pe rot etalon a periodic transmission peak of which is set to the center of the wavelength multiplex intervals of the main optical channel to a tunable filter having a transmission characteristic that is sharp in narrow band.

Yet still further, the optical signal quality supervisory device is characterized in that the supervisory optical channel has a signal format of a synchronous digital hierarchy, and in that the error detecting means conducts the quality supervision of the optical signal by the error detection by a bit interleaved parity of a section over head.

Yet still further, the optical signal quality supervisory device is characterized in that the supervisory optical channel has a forward error correction, and in that the error detecting means conducts the quality supervision of the optical signal by the error detection when the correction code is decoded.

BRIEF DESCRIPTION OF THE DRAWINGS

FIG. 3 is an explanatory diagram for the optical supervisory channel receiver in the optical signal quality supervisory device in accordance with the embodiment 2 of the present invention, in which the relation of the error rate of the reception band corresponding to STM-32 and the error rates of STM-16 and STM-1 is shown;

BEST MODE FOR CARRYING OUT THE INVENTION

Embodiment 1

Figure 1:
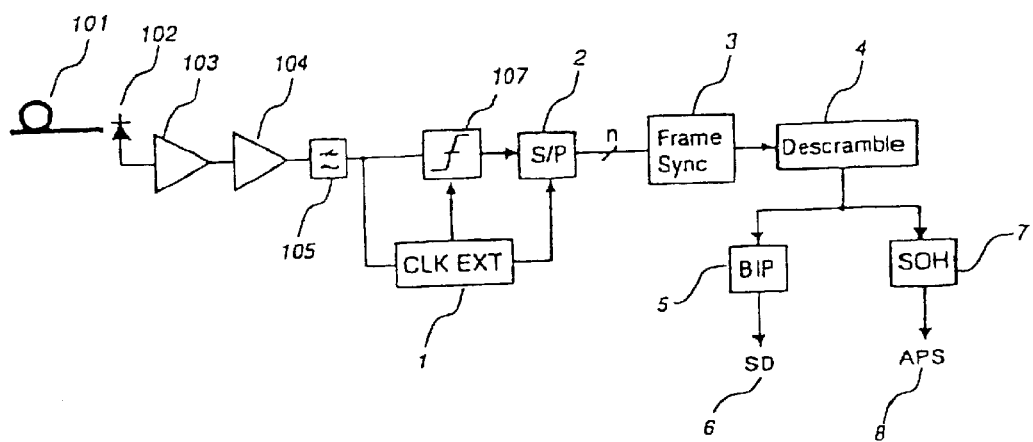
FIG. 1 is a block diagram showing the basic structure of an optical supervisory channel receiver in an optical signal quality supervisory device in accordance with an embodiment 1 of the present invention.
Figure 16:
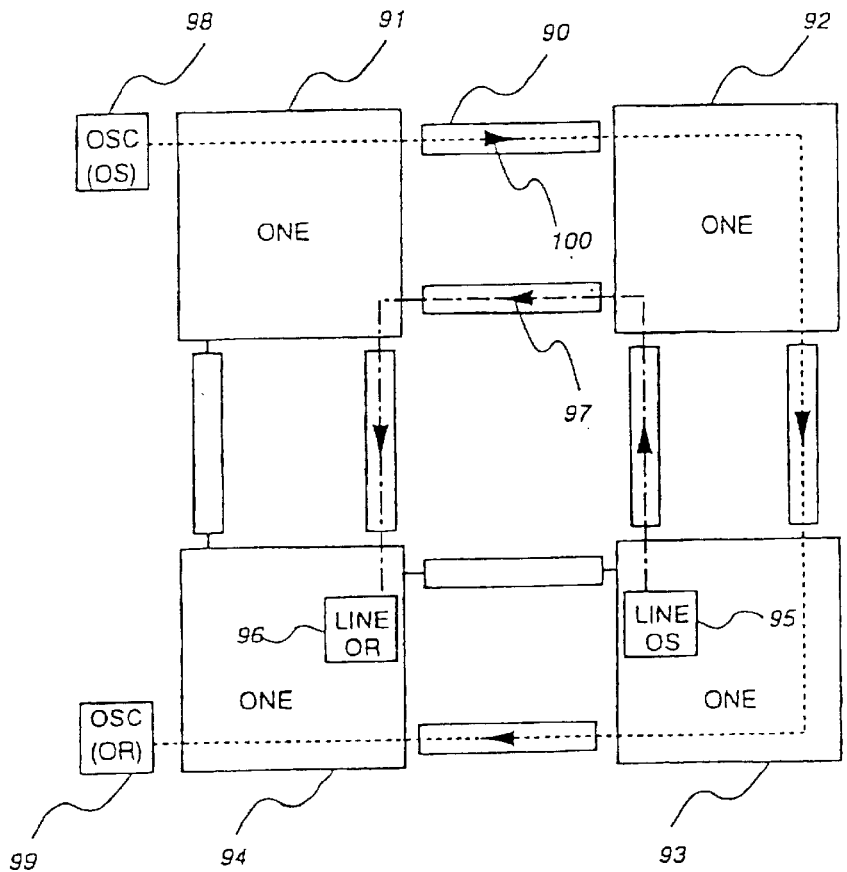
FIG. 16 is a conceptual diagram showing an optical wave network.
Figure 17:
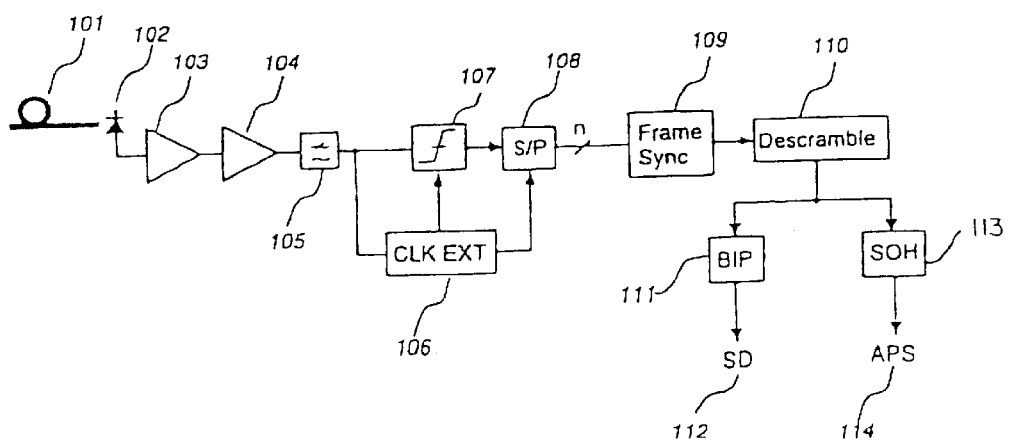
FIG. 17 is a block diagram showing the structure of an optical supervisory channel receiver in an optical signal quality supervisory device in a conventional example.

FIG. 1 is a structural block diagram showing an optical supervisory channel receiver in an optical signal quality supervisory device in accordance with an embodiment 1 of the present invention, which corresponds to the optical supervisory channel receiver 99 in the optical wave network as the optical communication system shown in FIG. 16 and also corresponds to the structure of the conventional example shown in FIG. 17.

It is assumed that the main signal of the optical communication system to which this embodiment is applied is of STM-16 (2.48832 Gbit/s). Also, it is assumed that the transmission line quality of the optical communication system, namely, the quality of STM-16 that is the main signal is supervised by an optical supervisory channel different from the main signal, and that an STM-1 (155.52 Mbit/s) signal is used for the optical supervisory channel.

In FIG. 1, parts denoted by 101 to 105 and 107 are similar to the inner structure of the conventional optical supervisory channel receiver 99 shown in FIG. 17, and in this embodiment, a circuit having a frequency band (about 3 GHz) dealing with the STM-16 signal is employed. As new reference numeral, 1 denotes a clock extraction circuit of 155.52 MHz corresponding to the STM-1 clock, 2 is a serial-parallel conversion circuit that converts the STM-1 signal into 8 parallel signals (19 Mbit/s), 3 is a 19 Mbit/s frame synchronizing circuit, 4 is a descramble circuit of a 19 Mbit/s signal, 5 is a BIP error detection circuit of STM-1, 6 is an SD alarm issued from the BIP error detection circuit 5, 7 is an SOH termination circuit of STM-1 and 8 is an APS byte.

In the structure shown in FIG. 1, the PD 102 to the discriminator 107 constitute reception discriminating means that receives through the optical fiber 101 a signal transmitted through the optical communication system, for example, shown in FIG. 16, for discriminating and reproducing an optical supervisory channel from the received signal, while the clock extraction circuit 1 to the SOH termination circuit 7 constitute error detecting means for detecting an error on the basis of the optical supervisory channel discriminated and reproduced, so as to supervise the transmission line quality of the optical communication system, namely, the quality of STM-16 that is the main signal.

In this example, the reception discriminating means having the PD 102 to the discriminator 107 has substantially the same electric band width as the electric band width of the main optical channel receiver 96 shown in FIG. 16, and the error detecting means having the clock extraction circuit 1 to the SOH termination circuit 7 has the electric band width narrower than the electric band width of the main optical channel receiver 96 shown in FIG. 16.

Subsequently, a description will be given of the operation of the optical supervisory channel receiver in the optical signal quality supervisory device in accordance with the embodiment 1 of the present invention shown in FIG. 1.

In FIG. 1, after the optical supervisory channel formed of the STM-1 signal is received by the PD 102 having the frequency band (about 3 GHz) corresponding to STM-16, the pre-amplifier 103 and the post-amplifier 104, it is subjected to band limit by the equivalent filter 105 of 0.7 times the STM-16, that is, the frequency band of 1.7 GHz and then discriminated and reproduced by the discriminator 107. In this situation, the code error rate Pe of the received signal is obtained by the following expression using Q value.

$$Pe = \frac{1}{2}\mathrm{erfc}(Q/\sqrt{2}) \approx \frac{1}{Q\sqrt{2}}\exp\left(-\frac{Q^2}{2}\right) \quad (1)$$

Assuming that the mean value and the distribution of the signal power is $\mu_1^2$ and $\sigma_1^2$, $Q=(\mu_1-\mu_0)/(\sigma_1+\sigma_0)$ is satisfied (the indices 1 and 0 are mark and space). In particular, if the receiver is made up of the optical pre-amplifier and the PD, the following expressions (2) and (3) are satisfied.

$$\mu_1 - \mu_0 = s(P_1 - P_0) \quad (2)$$

$$\sigma_1 + \sigma_0 = \sqrt{4s^2 P_1 P_{ASE} B_e + 4s^2 P_{ASE}^2 B_o B_e + I_{th}^2 B_e} + \sqrt{4s^2 P_0 P_{ASE} B_e + 4s^2 P_{ASE}^2 B_o B_e + I_{th}^2 B_e} \quad (3)$$

where s is a PD sensitivity, $P_1$ is a PD incident optical power, $P_{ASE}$ is a PD incident natural emitting optical power, $I_{th}$ is an input conversion noise current density, $B_0$ is a received light band width, and $B_\ominus$ is a received electric band width (equivalent filter band width).

As is apparent from the expressions (2) and (3), Q is proportional to $1/\sqrt{B_\ominus}$. This means that the code error rate does not depend on the signal bit rate but is determined according to the received electric band width. That is, even if the optical supervisory channel is STM-1 and different from STM-16 that is the main signal, if the received electric band width is the same, the code error rate characteristic is identical with that of STM-16 that is the main signal. If the clock extraction circuit 1, the serial-parallel conversion circuit 2, the frame synchronizing circuit 3, the BIP error detection circuit 5 and the SOH termination circuit 7 are structured for STM-16, it is not free from the high costs, an increase in power consumption and enlargement. However, according to this embodiment, those structural elements can be formed of a circuit for STM-1 which is simple, small in size and low in power consumption.

In FIG. 1, an example in which the main signal is STM-16 and the supervisory signal is STM-1 is described. However, the effect of the present invention is not limited to this. In particular, as the main signal is higher in bit rate (for example, STM-64), the usefulness of the present invention increases more because it becomes difficult to structure a circuit for extracting the BIP byte (a higher-speed semiconductor device is required with the results that the costs, the power consumption and the mounted volume increase).

Embodiment 2

Figure 2:
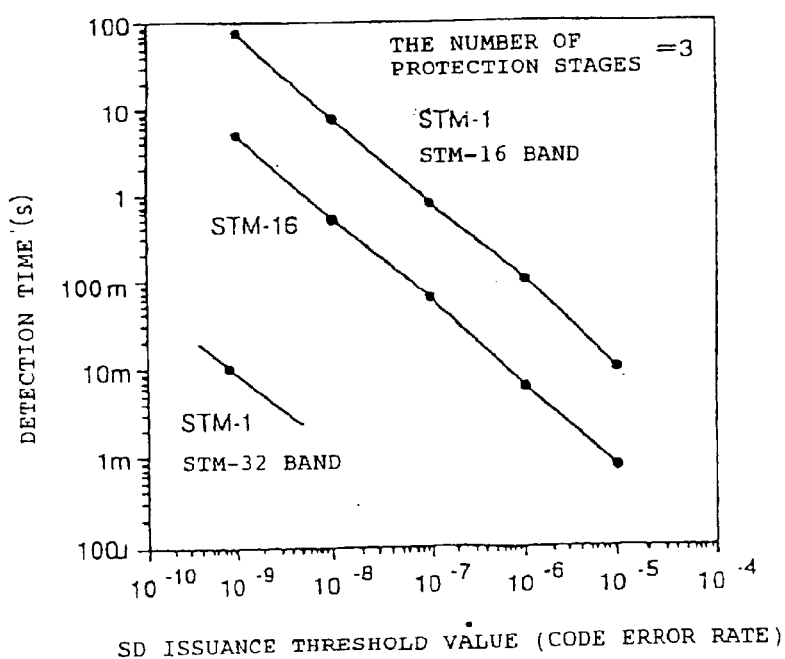
FIG. 2 is an explanatory diagram for an optical supervisory channel receiver in an optical signal quality supervisory device in accordance with an embodiment 2 of the present invention, in which a period of time required for issuing an SD alarm is calculated.

FIG. 2 shows the calculation for obtaining a period of time required for the error detection (time required for issuing SD) by BIP of the BIP error detection circuit 5 in the structure shown in FIG. 1.

It is assumed that an SD issuance threshold value is $10^{-6}$ and the number of protection stages is 3.

If B2 byte of STM-16 per se is detected, a period of time required for detection of $10^{-6}$ is 6 ms as indicated by a curve in the center of FIG. 2. On other hand, if B2 byte of STM-1 is observed in the received band corresponding to STM-16, the period of time is 98 ms as indicated by a curve on the upper portion of FIG. 2.

A method of further widening the received electric band width is effective in shortening the period of time required for issuing SD by the BIP error detection circuit 5. For example, let us consider that the SD issuance threshold value is $10^{-9}$. The period of time required for detecting B2 byte of STM-1 in the received band corresponding to STM-16 is 78 seconds.

FIG. 3 shows the error rates of STM-16 and STM-1 to the error rate viewed in the received band corresponding to STM-32 (3.7 GHz). As shown in FIG. 3, because $10^{-5}$ in the case where the received band corresponds to STM-32 corresponds $10^{-9}$ of STM-16, the period of time for detection which has previously taken 78 seconds can be reduced to 10 ms.

In other words, in the embodiment 1, in the optical supervisory channel receiver shown in FIG. 1, the reception discriminating means having the PD 102 to the discriminator 107 is so designed as to have substantially the same electric band width as the electric band width of the main optical channel receiver 96 shown in FIG. 16. On the other hand, in the embodiment 2, since the reception discriminating means is so designed as to have the electric band width wider than the electric band width of the main optical channel receiver 96, the SD alarm can be issued in a shorter time.

In the embodiments 1 and 2, the error detecting means having the clock extraction circuit 1 to the SOH termination circuit 7 is so structured as to have the electric band width narrower than the electric band width of the main optical channel receiver 96 shown in FIG. 16.

Embodiment 3

In the above-described embodiment 2, the method of shortening the period of time required for issuing the SD by making the electric band width of the reception discriminating means wider than the electric band width of the main optical channel receiver 96 is described. In the structure shown in FIG. 1, the period of time for the issuance can be shortened also when the discrimination threshold value of the discriminator 107 that functions as the structural element of the reception discriminating means is shifted from the optimum value.

Figure 4:
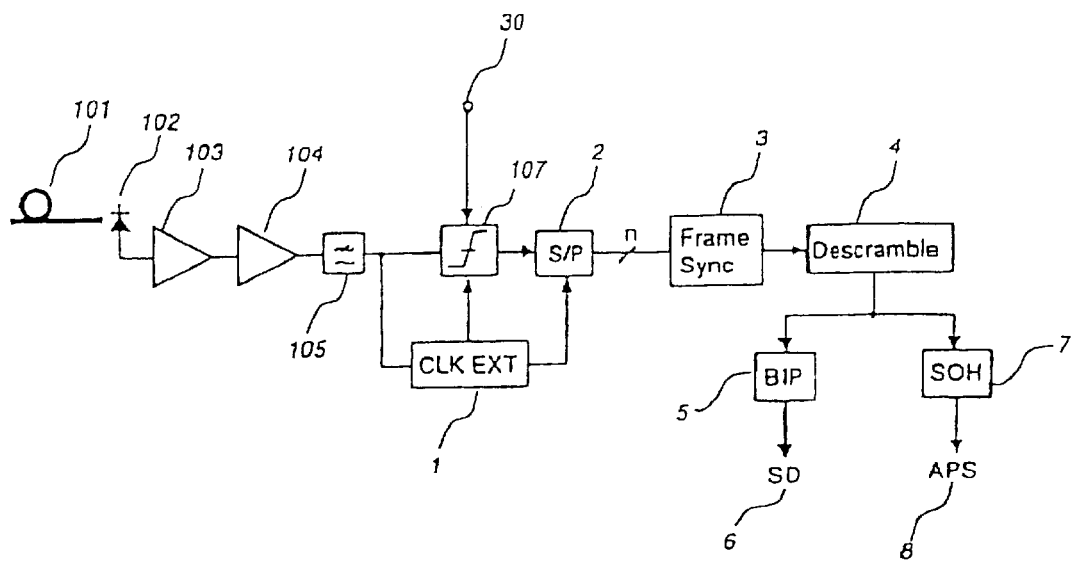
FIG. 4 is a block diagram showing the structure of an optical supervisory channel receiver in an optical signal quality supervisory device in accordance with an embodiment 3 of the present invention.

FIG. 4 is a structural block diagram showing an optical supervisory channel receiver in an optical signal quality supervisory device in accordance with an embodiment 3 of the present invention.

In FIG. 4, the same reference numerals as those in the embodiment 1 shown in FIG. 1 designate the identical parts, and their description will be omitted. What is different from the structure of the embodiment 1 shown in FIG. 1 resides in that a threshold voltage 30 different from the optimum threshold value of the discriminator 107 is applied.

Figure 5:
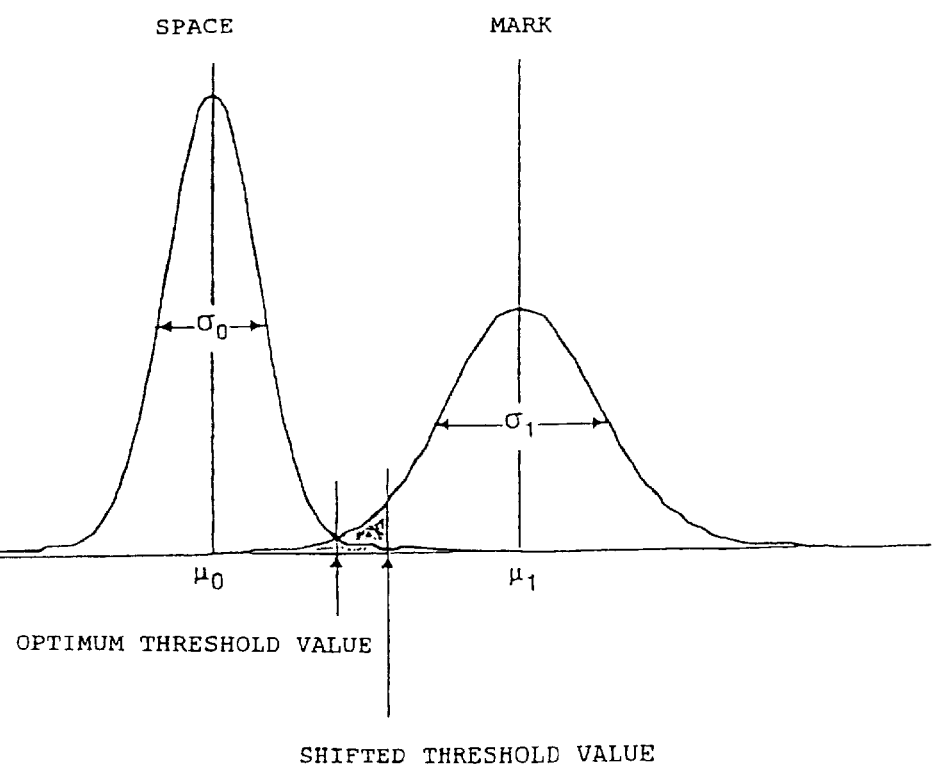
FIG. 5 is an explanatory diagram for explaining the setting of a discrimination threshold value of a supervisory light in the optical supervisory channel receiver in accordance with the embodiment 3 of the present invention.

Normally, the optimum threshold value of the discriminator 107 is set so that a rate at which marks are erroneously discriminated as spaces is equal to a rate at which the spaces are erroneously discriminated as the marks. In the receiver where a thermal noise is a main factor of the error, because the marks are equal in distribution to the spaces, the optimum threshold value is just in the center of the mean values of the marks and the spaces. However, in a system including the optical amplifier, in particular, the optical pre-amplification receiver, as shown in FIG. 5, because a signal-naturally emitted light beat noise is dominant, the distribution on the mark side becomes larger, and the optimum threshold value approaches the space side. Even in this case, if the threshold value is set just to the center of the mean values of the marks and the spaces, the code error rate characteristic produces a floor with the result that a timing that reaches the set error rate becomes quick. If a threshold voltage to be applied is D, the error rate is represented by Expression (4).

$$BER = \frac{1}{4}\left[erfc\left(\frac{\mu_1 - D}{\sigma_1\sqrt{2}}\right) + erfc\left(\frac{D - \mu_1}{\sigma_0\sqrt{2}}\right)\right] \quad (4)$$

Embodiment 4

Figure 6:
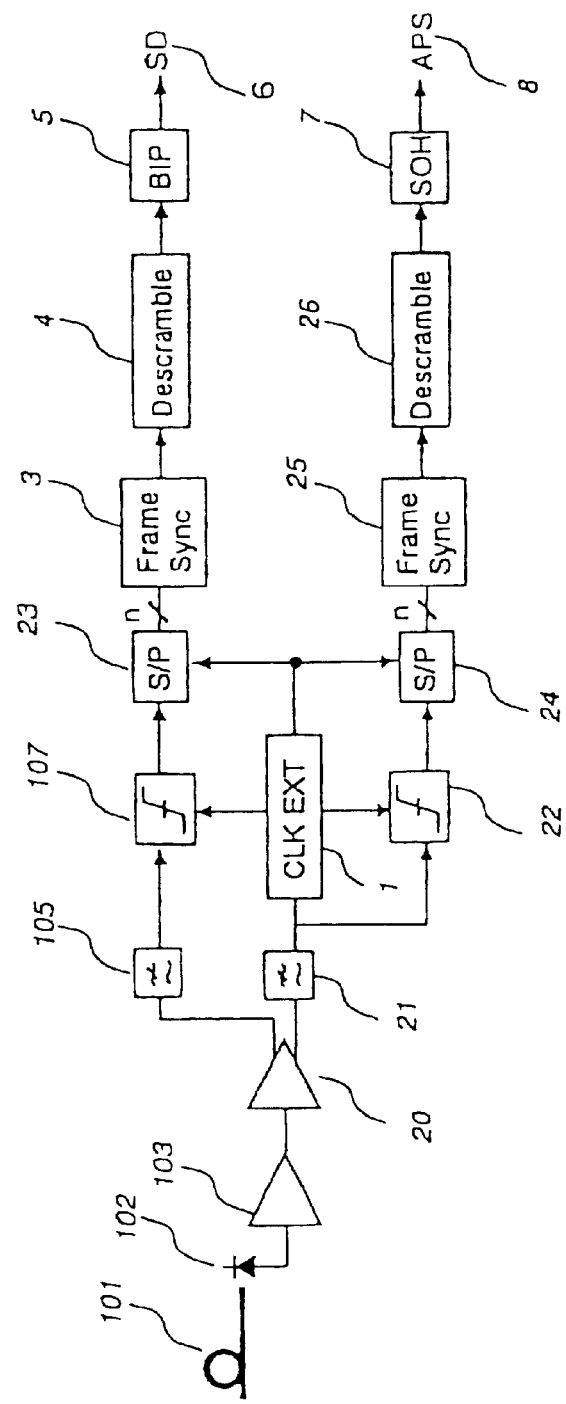
FIG. 6 is a block diagram showing the basic structure of an optical supervisory channel receiver in an optical signal quality supervisory device in accordance with an embodiment 4 of the present invention.

FIG. 6 is a block diagram showing the structure of an optical supervisory channel receiver in an optical signal quality supervisory device in accordance with an embodiment 4 of the present invention.

Similarly, in the embodiment 4, an STM-1 signal is used for the optical supervisory channel. On the other hand, in FIG. 6, the circuits denoted by reference numeral 101 to 103, 105 and 107 are identical with the circuits in the conventional example shown in FIG. 17, and are circuits having a frequency band dealing with the STM-16 signal. Also, the circuits denoted by reference numeral 1 to 3 and 8 are identical with the circuits in the embodiment 1 shown in FIG. 1 and are circuits having a frequency band dealing with the STM-1 signal. As new reference numeral, 20 denotes a post-amplifier having a frequency band of STM-16 and having two outputs. Reference numeral 21 is an equivalent filter of 0.7 times the bit rate of STM-1, that is, the frequency band of 0.1 GHz. Reference numeral 22 is a discriminator having a frequency band of the STM-1 signal, 23 is a serial-parallel conversion circuit of the STM-1 signal as in 2, 24 and 25 are circuits equivalent to the frame synchronizing circuit 3 of 19 Mbit/s and the descramble circuit 4, respectively.

Subsequently, a description will be given of the operation of the optical supervisory channel receiver of the optical signal quality supervisory device in accordance with the embodiment 4 shown in FIG. 6.

A difference of the structure shown in FIG. 6 from that of FIG. 1 resides in circuits including the equivalent filter 21 of the frequency band of 0.1 GHz to the SOH termination circuit 7 are connected in parallel with the circuit of FIG. 1. In FIG. 1, the clock signal is extracted from the STM-1 signal that has passed through the equivalent filter having the frequency band of 1.7 GHz. However, in this embodiment, a clock is extracted from the STM-1 signal having the natural frequency band of 0.1 GHz. Because it is necessary to transfer the APS byte to another ONE with accuracy, it is desirable that the termination of SOH is conducted without any error. In this example, because the signal is discriminated and reproduced from the STM-1 signal which is limited to a natural narrow frequency band by the equivalent filter 21, the APS byte can be reproduced at a low error rate.

On the other hand, the code error rate characteristic exhibited by the BIP error detection circuit 5 is completely identical with that of the STM-16 receiver as in FIG. 1. However, because a signal to be processed is STM-1, a circuit for conducting the error count of BIP can be made small in size, low in power consumption and low in the costs. In other words, while the SD alarm issuance is equivalent to that of the main signal (STM-16), the termination of SOH is conducted without any error.

Figure 7:
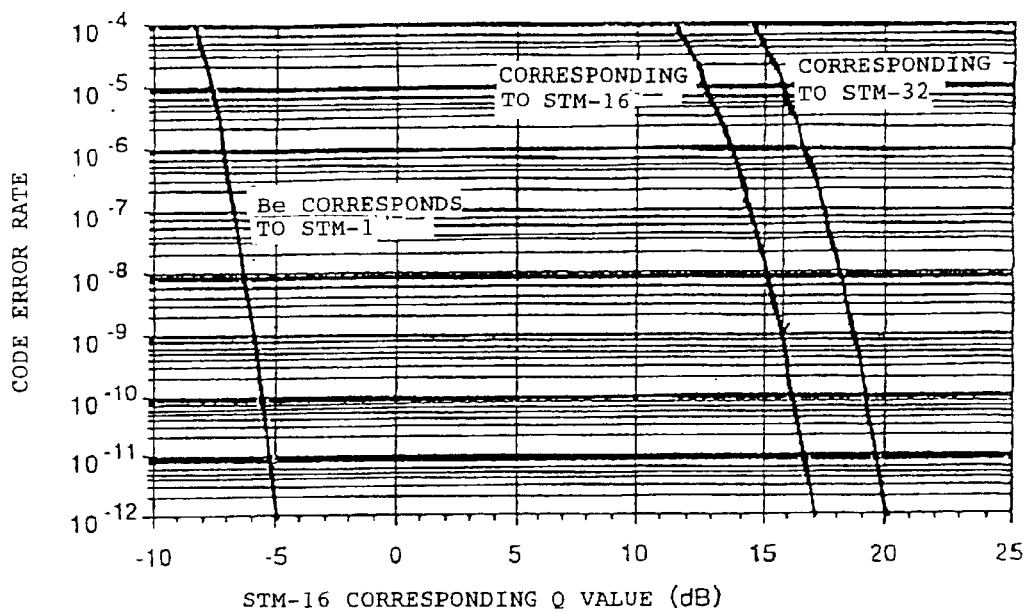
FIG. 7 is an explanatory diagram showing the calculation result for supplementally explaining the operation according to the embodiment 4 of the present invention.

FIG. 7 shows the calculation of the error rate when the axis of abscissa represents the Q value of the main signal (STM-16) to be supervised whereas the reception equivalent band width is a parameter. Even in a region where an error starts to occur in STM-16, it is found that the sufficiently low error rate is held in STM-1.

In other words, in the embodiment 4, since another optical supervisory channel receiving means having the electric band width that is equal to or less than the bit rate of the optical supervisory channel is disposed in parallel with the optical supervisory channel receiving means, the APS byte can be reproduced at a low error rate. On the other hand, while the code error rate characteristic exhibited by the BIP error detection circuit is completely identical with that of the main optical channel, because a signal to be processed is low in bit rate, a circuit for conducting the error count of BIP can be made small in size, low in power consumption and low in the costs.

Embodiment 5

Figure 8:
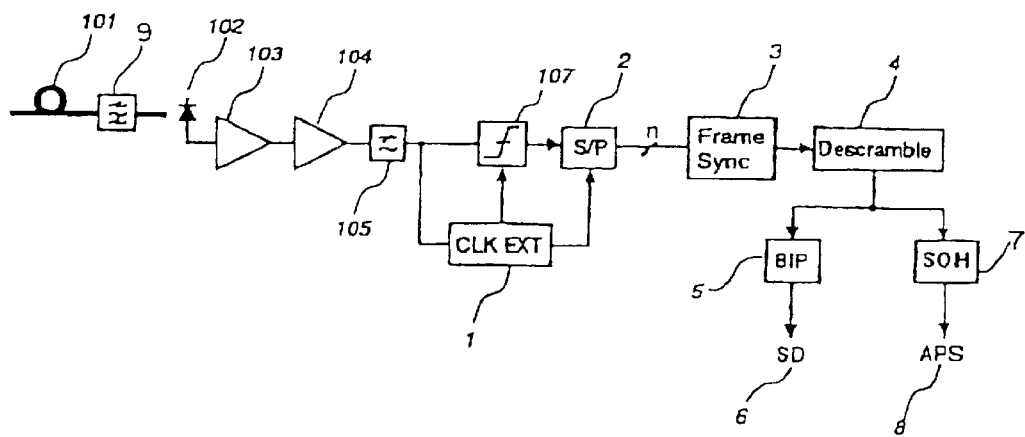
FIG. 8 is a block diagram showing the basic structure of an optical supervisory channel receiver in an optical supervisory channel receiver in accordance with an embodiment 5 of the present invention.

Subsequently, FIG. 8 is a structural block diagram showing an optical supervisory channel receiver in an optical signal quality supervisory device in accordance with an embodiment 5 of the present invention.

In FIG. 8, the same parts as those in the embodiment 1 shown in FIG. 1 are designated by the same references, and their description will be omitted. As new reference numeral, 9 denotes a band pass filter disposed on a reception end, and its pass band is set according to the gain of the optical amplifier in the wavelength multiplex system formed by multi-relaying optical amplifiers which amplify a plurality of main optical channels having different wavelengths as will be described later.

Figure 9:
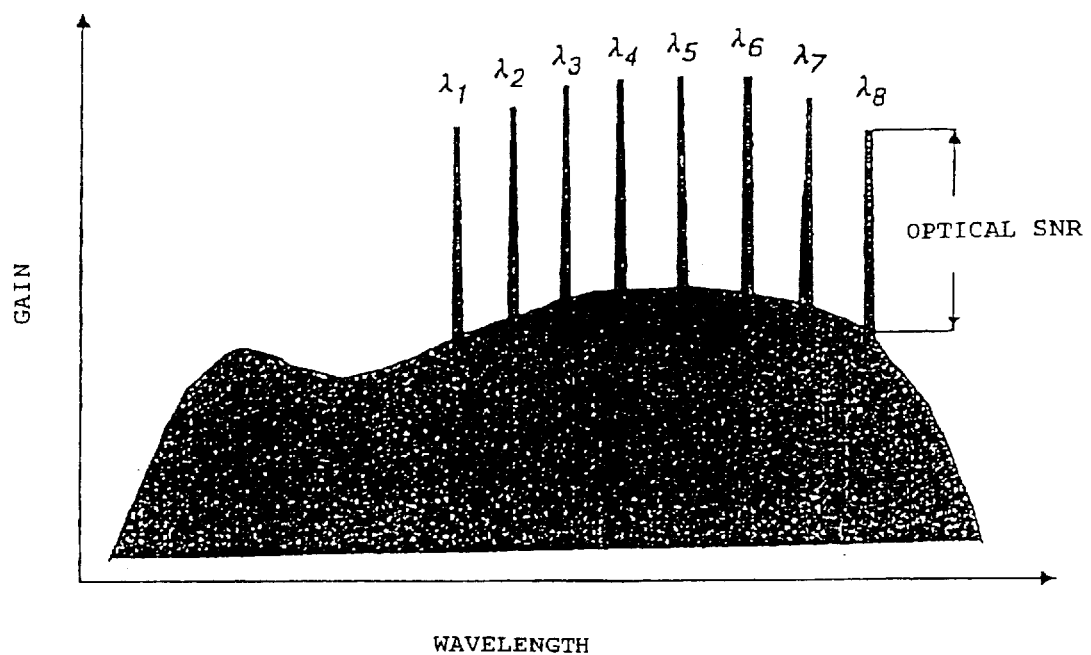
FIG. 9 is an explanatory diagram showing an optical spectrum used for explanation of the embodiment 5 and an embodiment 6 of the present invention.

In other words, FIG. 9 shows the optical spectrum of the wavelength multiplex signal. Normally, when the optical amplifiers (erbium doped fiber amplifier) are relayed at multiple stages, the powers of the respective wavelengths are set so that the optical SNRs are substantially equal to one another at the reception end.

Figure 10:
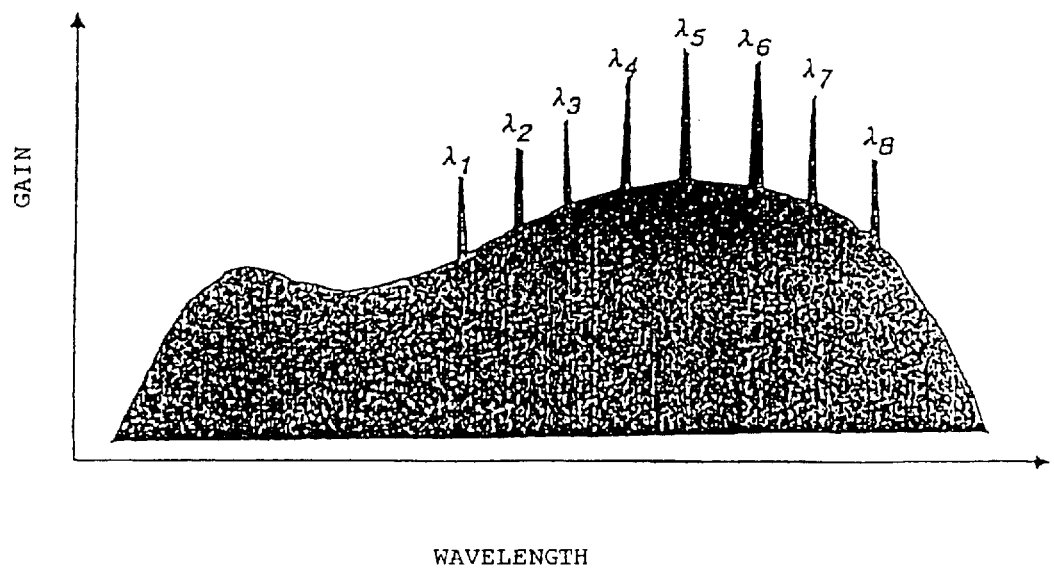
FIG. 10 is an explanatory diagram showing an optical spectrum used for explanation of the embodiments 5 and 6 of the present invention.

Also, FIG. 10 shows the optical spectrum of the wavelength multiplex signal when the optical SNR is degraded by the degradation of the optical signal quality.

The degradation of the optical SNR is most remarkable in the wavelength at an end where the gain of the optical amplifier is small.

Accordingly, if the wavelength of the optical supervisory channel is set to the gain minimum wavelength (in the case of FIGS. 9 and 10, $\lambda_1$, or $\lambda_8$), because the optical signal quality is most quickly degraded as compared with other wavelengths, the SD alarm can be issued as soon as possible, as a result of which the preventive safe supervision can be made in the wavelength multiplex system.

Embodiment 6

In the above-described embodiment 5, the pass band of the :band pass filter 9 shown in FIG. 8 is set to the gain minimum wavelength of the optical amplifier in the wavelength multiplex system. On the other hand, in an embodiment 6, the pass band of the band pass filter 9 is set to the gain peak wavelength of the optical amplifier in the wavelength multiplex system. In FIGS. 9 and 10, if the wavelength of the optical supervisory channel is set to the gain peak wavelength (in the case of FIGS. 9 and 10, $\lambda_5$), because the degradation of the optical signal quality is the lowest in speed as compared with other wavelengths, the SD alarm can be lastly issued while the lines of other wavelengths start one after another to issue the errors. In a case of an important judgement pertaining to the interruption of a network, as in the restoration of the wavelength multiplex system is conducted using the SD alarm, it is effective to prevent the SD from being issued in error.

Embodiment 7

As described with reference to FIGS. 9 and 10, in the wavelength multiplex that conducts optical amplification relay, because the optical SNR is different depending on the wavelength, the accuracy is not sufficient in supervision of the quality of the main optical channel of the optical SNRs different in wavelength by one optical supervisory channel.

Figure 11:
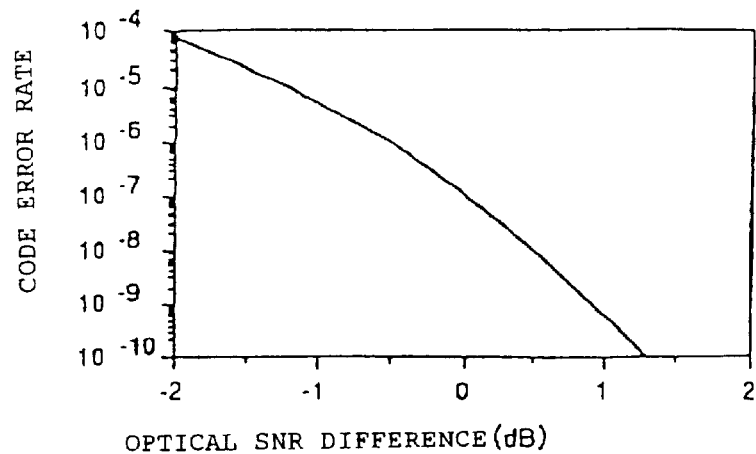
FIG. 11 is an explanatory diagram showing the calculation result for explaining a problem with an embodiment 7 of the present invention.

FIG. 11 shows the result of calculating a relation between the difference in optical SNRs and the code error rate.

As shown in FIG. 11, in order to detect the code error rate within ±1 figure, it is necessary that the difference in the optical SNRs is within ±0.5 dB.

Figure 12:
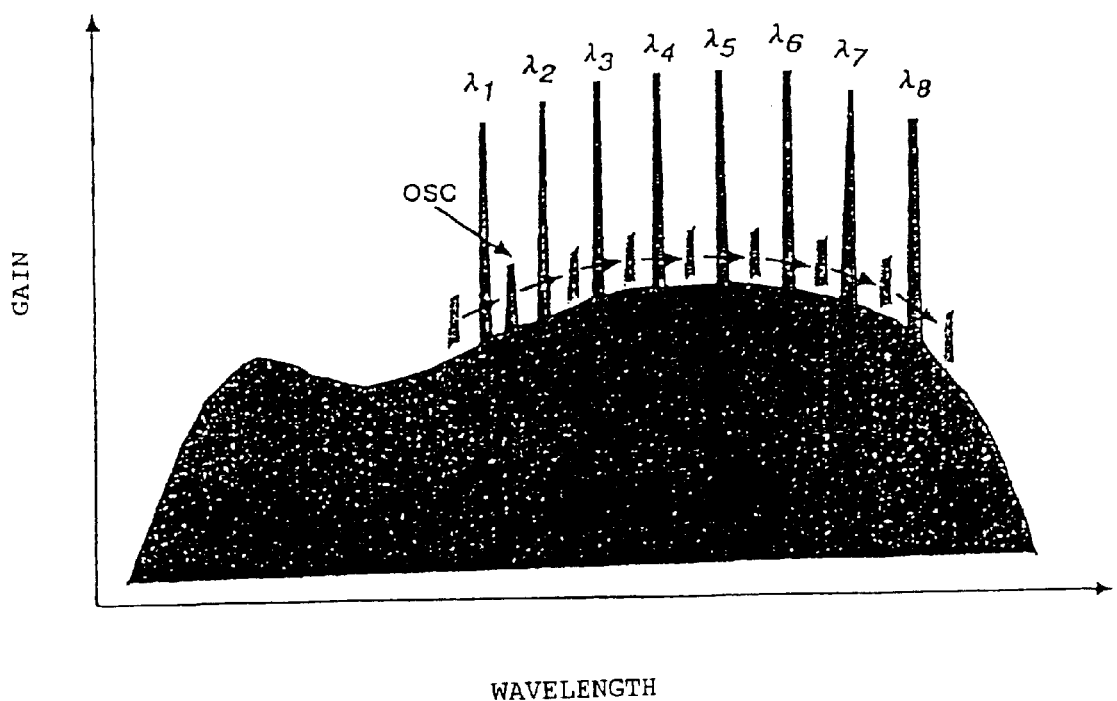
FIG. 12 is an explanatory diagram showing an optical spectrum used for explanation of the embodiment 7 of the present invention.

FIG. 12 is to explain the embodiment 7 in which the wavelength of the optical supervisory channel is swept.

In other words, in the embodiment 7, in FIG. 12, the wavelength of the optical supervisory channel is swept at intervals so as to sew between the wavelengths of the multiplexed optical main channel.

Figure 13:
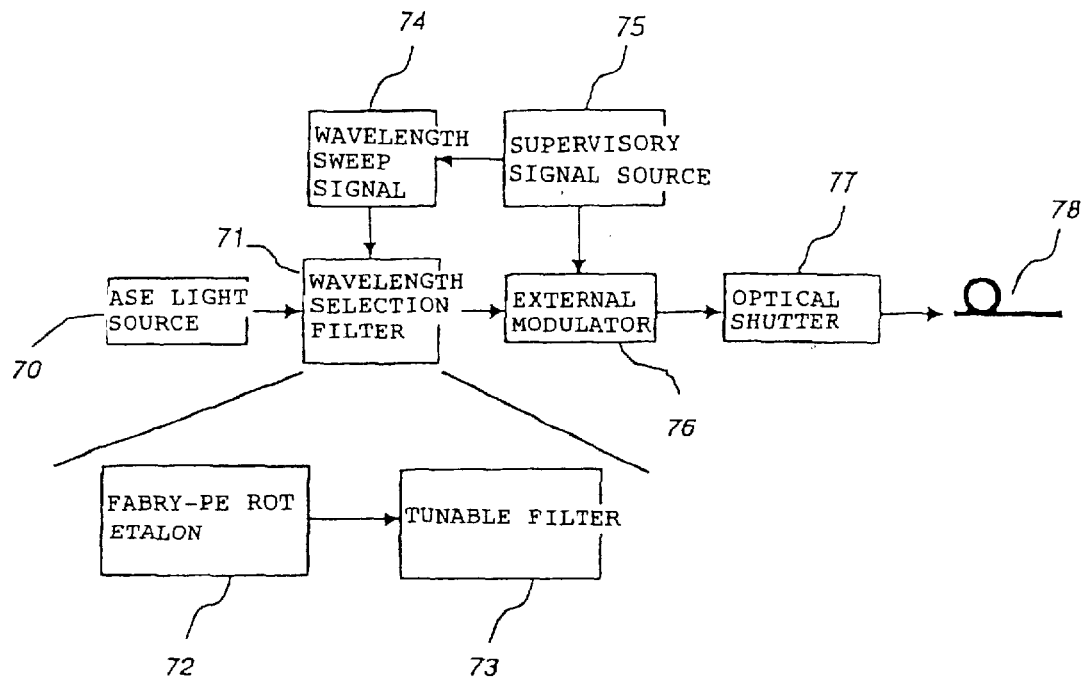
FIG. 13 is a block diagram showing an optical supervisory channel transmitter in an optical signal quality supervisory device in accordance with the embodiment 7 of the present invention.

FIG. 13 is a block diagram showing a sweeping circuit that discretely sweeps the wavelength of the optical supervisory channel between the wavelengths of the adjacent optical main channels, and the sweeping circuit is provided in the optical supervisory channel transmitter 98 shown in FIG. 16.

In FIG. 13, reference numeral 70 denotes an ASE (amplified spontaneous emission) light source, 71 is a wavelength selection filter, 74 is a wavelength sweep signal, 75 is a supervisory signal source, 76 is an external modulator, 77 is an optical shutter and 78 is an optical fiber.

The operation of the above structure will be described.

The ASE light source 70 is, for example, an erbium doped fiber amplifier where no input is made and generates a wide-band noise light (ASE light). The wavelength selection filter 71 is swept by a step-like signal generated from the wavelength sweep signal 74 that is synchronous with the supervisory signal source 75. The wavelength selection filter 71 can be formed, for example, by connecting a Fabry-Pe rot etalon 72 and a tunable filter 73 in series.

Figure 14:
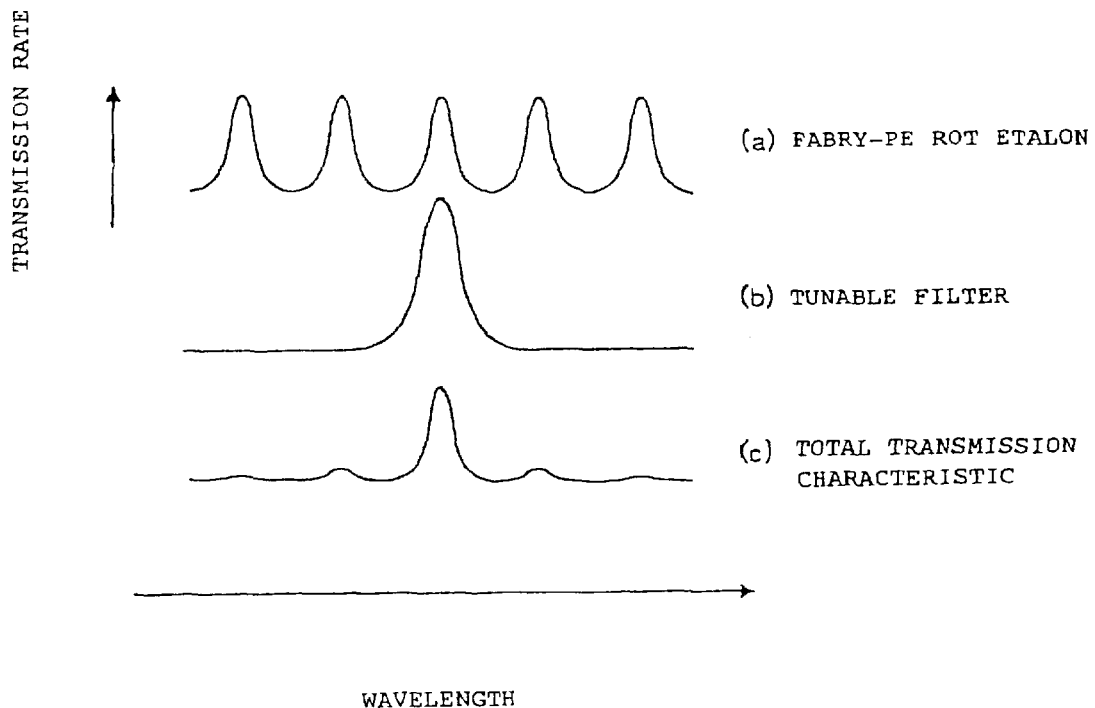
FIG. 14 is a characteristic diagram for explaining the operation of a wavelength selection filter in accordance with the embodiment 7 of the present invention.

The wavelength transmission characteristic of this case is shown in FIG. 14.

In the Fabry-Pe rot etalon 72, a periodic transmission peak is set just to the center of the wavelength multiplex intervals of the main optical channel as shown in FIG. 14(*a*).

Then, the transmission peak is allowed to pass through the tunable filter 73 exhibiting the transmission characteristic in FIG. 14(*b*), to thereby provide the total pass characteristic shown in FIG. 14(*c*).

The tunable filter 73 can be readily realized by changing a slope of a dielectric multi-layer film. However, because it is difficult to obtain the transmission characteristic sharp in a narrow band, the tunable filter 73 is connected in series to the Fabry-Pe rot etalon 72.

The ASE light cut off through the above wavelength selection filter 71 is modified by the supervisory signal source 75 in the external modulator 76. The optical shutter 77 shuts out an output when crossing the wavelength of the main signal at the time of sweeping the wavelength.

As a result, because supervision is made possible in the wavelength close to the optical main channel to be supervised, a difference in the optical SNR between the optical main channel and the optical supervisory channel becomes small, to thereby conduct higher-accuracy supervision.

Embodiment 8

In the above-described embodiments 1 to 7, all of the error detecting means are so designed as to detect the code error by using BIP (bit interleaved parity) provided in the section overhead of the synchronous digital hierarchy. Other than that, the same effect can be exhibited also when the error detecting function of the forward error correction (FEC) is used.

Figure 15:
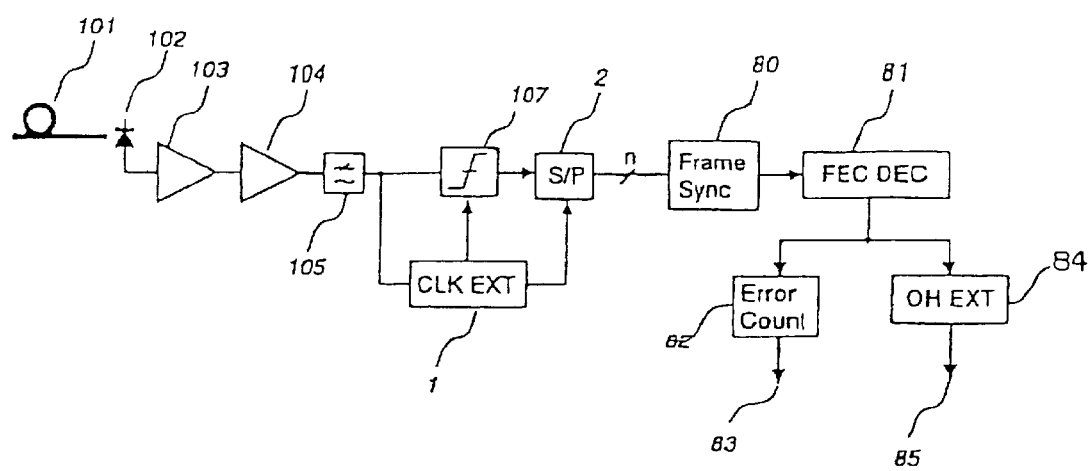
FIG. 15 is a block diagram showing an optical supervisory channel receiver in an optical signal quality supervisory device in accordance with an embodiment 8 of the present invention.

FIG. 15 shows the structure of an optical supervisory channel receiver in accordance with an embodiment 8 of the present invention in which FEC is used.

In FIG. 15, reference numeral 80 denotes a frame synchronizing circuit; 81, an FEC decoding circuit; 82, an error detection circuit; 83, a detected error; 84, an overhead extraction circuit; and 85, a system alarm transfer byte. The clock extraction circuit 1, the serial-parallel conversion circuit 2, the frame synchronizing circuit 80, the FEC decoding circuit 81, the error detection circuit 82 and the overhead extraction circuit 84 constitute the error detecting means that conducts the error detection when the forward error correction is decoded.

Subsequently, the operation of the above-described structure will be described.

The optical supervisory channel is made up of, for example, a well-known lead solomon code RS (255, 239). The bit rate is set to be sufficiently lower than the main signal. On the other hand, the PD 102 to the discriminator 107 in the circuit shown in FIG. 15 are identical with those shown in FIG. 1, and receive the optical supervisory channel in the same wide band as that of the main signal. An error occurring in the error detection circuit 82 can be counted through the FEC decoding circuit 81. On the other hand, since the overhead is subjected to error correction, a high quality is obtained. In general, in the case of using RS (255, 239), the coding gain is obtained at the error rate of $10^{-9}$.

With the above operation, while the error is detected, which is an original purpose, a high quality of the system alarm byte which must not be false is obtained by error correction.

As described above, according to the present invention, in the optical signal quality supervisory device including: optical supervisory channel transmitting means that transmits an optical supervisory channel for supervising the transmission line quality of an optical communication system to a main optical channel receiving means that receives a main optical channel transmitted over the optical communication system, and an optical supervisory channel receiving means that receives the optical supervisory channel transmitted through the optical communication system to supervise the quality of the transmission line, the bit rate of the optical supervisory channel is made lower than the bit rate of the main optical channel, and there are provided, as the optical supervisory channel receiving means, reception discriminating means that receives the signal transmitted through the optical communication system to discriminate and reproduce the optical supervisory channel from the received signal, and error detecting means that has an electric band width narrower than the electric band width of the main optical channel receiving means and detects an error on the basis of the optical supervisory channel that is discriminated and reproduced by the reception discriminating means. With the above structure, there can be obtained the optical signal quality supervisory device which is capable of supervising the quality of an optical signal simply, efficiently and with high accuracy without inviting an increase in circuit scale, high costs and an increase in power consumption.

Also, by making the electric band width of the reception discriminating means substantially equal to the electric band width of the main optical channel receiving means, even if the optical supervisory channel is low in bit rate, the code error rate characteristic is the same as that of the main signal of the high bit rate with the result that a circuit that is simple, small in size and low in power consumption can be employed.

Further, by making the electric band width of the reception discriminating means wider than the electric band width of the main optical channel receiving means, the SD alarm can be issued in a shorter time.

Still further, the discrimination threshold value that discriminates the optical supervisory channel of the reception discriminating means is so set as to be shifted from the optimum threshold value, whereby the SD alarm can be issued in a shorter time.

Yet still further, another optical supervisory channel receiving means having the electric band width equal to or less than the bit rate of the optical supervisory channel is provided in parallel with the optical supervisory channel receiving means, whereby the APS byte can be reproduced at a low error rate. Also, while the code error rate characteristic is identical with that of the main signal, because a signal to be processed is low in bit rate, a circuit for conducting the error count of BIP can be made small in size, low in power consumption and low in the costs.

Yet still further, the optical communication system is formed of a wavelength multiplex system that relays optical amplifiers that amplify a plurality of main optical channels different in wavelength at multiple stages, in which the optical supervisory channel receiving means includes, at its reception end, a band pass filter a pass band of which is set in accordance with the gain of the optical amplifiers in the wavelength multiplex system. With the above structure, the preventive safe supervision can be made in the wavelength multiplex system.

Yet still further, the pass band of the band pass filter is set to the gain minimum wavelength of the optical amplifiers in the wavelength multiplex system. With this structure, because the optical signal quality is most quickly degraded as compared with other wavelengths, the SD alarm can be issued as soon as possible.

Yet still further, the pass band of the band pass filter is set to the gain peak wavelength of the optical amplifiers in the wavelength multiplex system. With the above structure, because the degradation of the optical signal quality is the lowest in speed as compared with other wavelengths, the SD alarm can be lastly issued while the lines of other wavelengths start one after another to issue the errors. In the case of an important judgement pertaining to the interruption of a network, as in the restoration of the wavelength multiplex system is conducted using the SD alarm, it is effective to prevent the SD from being issued in error.

Yet still further, the optical supervisory channel transmitting means includes sweeping means for discretely sweeping the wavelength of the optical supervisory channel between the wavelengths of the adjacent main optical channels. With the above structure, because supervision is made possible in the wavelength close to the optical main channel to be supervised, a difference in the optical SNR between the optical main channel and the optical supervisory channel becomes small, to thereby conduct higher- accuracy supervision.

Yet still further, the sweeping means includes a light source that generates a noise light over a wide band; a supervisory signal source; a wavelength selection filter connected to the light ;source and swept by a step-like signal generated from a wavelength sweep signal synchronous with the supervisory signal source; a modulator that modulates the noise light from the light source which is cut off by the wavelength selection filter according to the supervisory signal source; and an optical shutter that shuts out an output of the modulator when crossing the wavelength of the main signal. With the above structure, because supervision is made possible in the wavelength close to the optical main channel to be supervised, and a circuit that conducts higher-accuracy supervision can be structured.

Yet still further, since the wavelength selection filter is formed by connecting in series Fabry-Pe rot etalon a periodic transmission peak of which is set to the center of the wavelength multiplex intervals of the main optical channel to a tunable filter having a transmission characteristic that is sharp in narrow band, the wavelength selection filter excellent in wavelength selectivity can be structured.

Yet still further, since the supervisory optical channel has a signal format of a synchronous digital hierarchy, and the error detecting means conducts the quality supervision of the optical signal by the error detection by the bit interleaved parity of the section over head, the signal quality can be supervised efficiently and accurately.

Yet still further, the supervisory optical channel has a forward error correction, and the error detecting means conducts the quality supervision of the optical signal due to the error detection when the forward error correction is decoded. With the above structure, the signal quality can be supervised efficiently and accurately.

INDUSTRIAL APPLICABILITY

According to the present invention, the bit rate of an optical supervisory channel for supervising the transmission line quality of an optical communication system is made lower than the bit rate of a main optical channel transmitted over the optical communication system, and there is provided error detecting means that has the electric band width narrower than the electric band width of receiving means that receives the main optical channel and detects an error on the basis of the optical supervisory channel that is discriminated and reproduced by the reception discriminating means that discriminates the optical supervisory channel from the received signal transmitted through the optical communication system. With the above structure, the quality of the optical communication system, in particular, the light wave network can be supervised efficiently and with high accuracy.

What is claimed is:

1. An optical signal quality supervisory device comprising:

an optical supervisory channel for supervising the transmission line quality of an optical communication system;

main optical channel receiving means that receives a main optical channel transmitted over the optical communication system; and optical supervisory channel receiving means that receives said optical supervisory channel transmitted through the optical communication system to supervise the quality of the transmission line, wherein the bit rate of the optical supervisory channel is made lower than the bit rate of the main optical channel; and wherein said optical supervisory channel receiving means includes:

reception discriminating means that receives the signal transmitted through the optical communication system according to one of the following:

a) an electric band width of the reception discriminating means being substantially the same as the electric band width of said main optical channel receiving means; and b) the electric band width of the reception discriminating means being wider than the electric band width of said main optical channel receiving means to discriminate and reproduce the optical supervisory channel from the received signal to discriminate and reproduce the optical supervisory channel from the received signal; and error detecting means that has an electric band width being narrower than the electric band width of said main optical channel receiving means and detects an error on the basis of the optical supervisory channel which is discriminated and reproduced by said reception discriminating means.

2. The optical signal quality supervisory as claimed in claim 1, wherein a discrimination threshold value of said reception discriminating means which discriminates the optical supervisory channel is set such that it is shifted from an optimum threshold value.

3. An The optical signal quality supervisory devices as claimed in claim 1, wherein a further optical supervisory channel receiving means having the electric band width equal to or less than the bit rate of the optical supervisory channel is provided in parallel with said optical supervisory channel receiving means.

4. The optical signal quality supervisory device as claimed in claim 1, wherein the optical communication system comprises a wavelength multiplex system that relays at multiple stages optical amplifiers which amplify a plurality of main optical channels that are different in wavelength and in that said optical supervisory channel receiving means includes, at its reception end, a band pass filter a pass band of which is set in accordance with the gain of the optical amplifiers in said wavelength multiplex system.

5. The optical signal quality supervisory device as claimed in claim 4, wherein the pass band of said band pass filter is set to the gain minimum wavelength of the optical amplifiers in said wavelength multiplex system.

6. The optical signal quality supervisory device as claimed in claim 4, wherein the pass band of said band pass filter is set to the gain peak wavelength of the optical amplifiers in said wavelength multiplex system.

7. The optical signal quality supervisory device as claimed in claim 4, wherein said optical supervisory channel transmitting means includes sweeping means for discretely sweeping the wavelength of the optical supervisory channel between the wavelengths of the adjacent main optical channels.

8. The optical signal quality supervisory device as claimed in claim 7, wherein said sweeping means comprises:

a light source that generates a noise light over a wide band;

a supervisory signal source;

a wavelength selection filter connected to said light source and swept by a step-like signal generated from a wavelength sweep signal synchronous with said supervisory signal source;

a modulator that modulates the noise light from said light source, which is cut off by the wavelength selection filter according to said supervisory signal source; and an optical shutter that shuts out an output of the modulator when crossing the wavelength of the main signal.

9. The optical signal quality supervisory device as claimed in claim 8, wherein said wavelength selection filter is formed by connecting in series Fabry-Pe rot etalon a periodic transmission peak of which is set to the center of the wavelength multiplex intervals of the main optical channel to a tunable filter having a transmission characteristic that is sharp in narrow band.

10. The optical signal quality supervisory devices as claimed in claim 1, wherein said supervisory optical channel has a signal format of a synchronous digital hierarchy, and wherein said error detecting means conducts the quality supervision of the optical signal by the error detection by a bit interleaved parity of a section over head.

11. The optical signal quality supervisory device as claimed in claim 1, wherein said supervisory optical channel has a forward error correction, and wherein said error detecting means conducts the quality supervision of the optical signal by the error detection when the correction code is decoded.

* * * * *